June 5, 1945.    J. J. HENNESSY    2,377,418
LOCOMOTIVE DRIVER LINER STRUCTURE
Filed Oct. 19, 1942

INVENTOR:
JAMES J. HENNESSY
By Rodney Bedell,
ATTORNEY

Patented June 5, 1945

2,377,418

UNITED STATES PATENT OFFICE 2,377,418

LOCOMOTIVE DRIVER LINER STRUCTURE

James J. Hennessy, Montclair, N. J.

Application October 19, 1942, Serial No. 462,468

11 Claims. (Cl. 308—165)

The invention relates to railway hub liners such as are adapted particularly to receive the thrust between the hub of a locomotive driving wheel and the opposing face of the axle box, the main object of the invention being to prevent wear of the opposing faces on these major parts and, by making the liner readily renewable, decrease the expense of maintaining minimum or desirable amount of play between the wheeled axle and its boxes transversely of the locomotive.

Ordinarily the driving wheel hub face is a part of the cast wheel. The driving box, also usually of cast metal, has a layer of bearing material, ordinarily brass or bronze, either brazed or otherwise fastened to the face of the box, and when this facing is worn to the minimum allowable and providing undue play of the axle and wheels transversely of the locomotive frame, it is necessary to drop the axle and wheels and remove the box to build out the face of the box with brass or bronze to bring the face of the box back to its normal plane. This operation involves substantial expense for labor and loss of service of the locomotive. The main object of the present invention is to avoid this expense and loss. The invention contemplates the mounting of a two-part liner member in a recess formed in the wheel hub, the two parts being separable for application and removal but, when applied, being constructed and assembled so as to avoid likelihood of unintentional separation, breakage, or injury to the opposing faces of the hub and box.

By avoiding fixed attachment of the liner to the wheel or box and by providing for lubrication of the opposite faces of the floating liner, the amount of wear on all the parts is reduced and the life of the liner is extended because the sudden blows between wheel and box are cushioned by the lubricant and because the sudden application of rotatable forces resulting when the box and hub grip the liner between them are cushioned or dissipated by the lubricant and by the floating mounting of the liner.

By seating the liner in a recess in the hub the liner may be made substantially thicker than if it were positioned wholly between the normal faces of the box and hub and, therefore, the rigidity of the liner and its resistance to deformation, because of pounding between the box and hub, is increased, and hence more detailed objects of the invention are to prolong the life of the liner and to extend the periods between renewal of the liner.

These objects are attained by the structure described below, reference being had to the accompanying drawing in which—

A portion of the locomotive driver hub and its axle are shown at 1 and 2 respectively. Usually the wheel is pressed on the axle and cannot be removed or replaced easily. The axle supports its load through the bearing 3 seated in the axle box 4 upon which the locomotive frame (not shown) will be carried in the usual manner.

Figure 2:
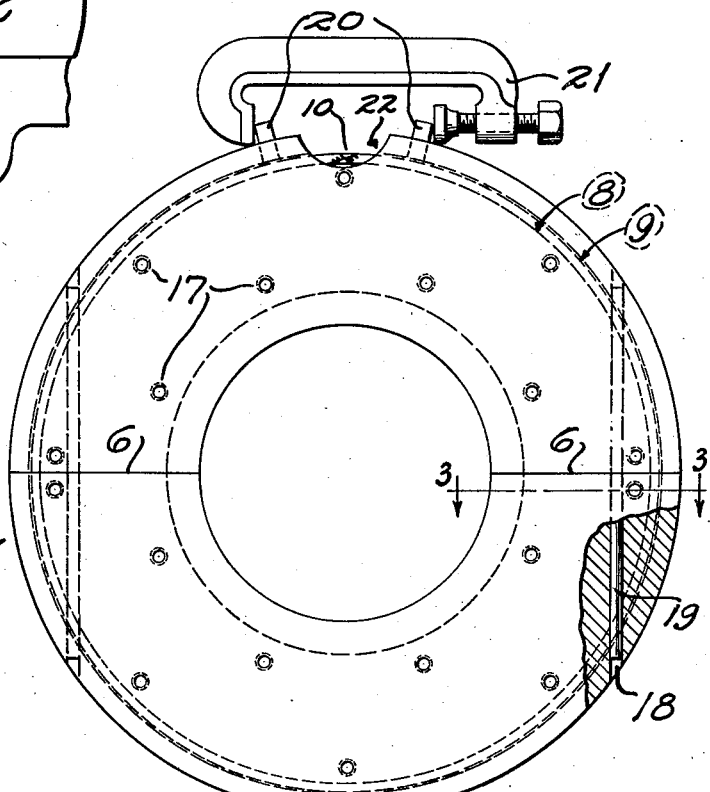
Figure 2 is an elevation of the liner and also shows a tool used in assembling the liner about the axle.

A floating liner 5 is positioned between the opposing faces of the axle box and wheel hub. The liner comprises an annular disc divided transversely, as indicated at 6 (Figure 2), to facilitate its application to the wheeled axle. The outer periphery of the liner is shouldered transversely of the thickness of the liner and the liner portion 7 of smaller diameter has a circumferential groove 8. The two halves of the liner are held together by a band 9 seated in groove 8. The ends of the band are cut diagonally and are brought into abutting relation, as indicated at 10, and there welded together, thus forming an endless retaining device having a circular periphery corresponding to the circular periphery of liner portion 7. The liner portion 11 of larger diameter provides the liner with a hub opposing annular surface 12 extending radially beyond portion 7 and band 9.

The box opposing face of the wheel hub is provided with an annular recess indicated at 13 receiving the small diameter portion of the liner and the retaining band. The inner rim 14 of the hub recess fits around the inner periphery 15 of the small diameter portion of the liner and the outer rim 16 of the hub fits around the outer periphery of the small diameter portion of the liner and of the retaining band.

Preferably the liner is provided with a plurality of transverse passages 17 tapered from the hub opposing face of the liner to the other face so that lubricant applied to the crevice between the liner and box will work to the face of the liner having the larger diameter end of the passages and accumulate in recess 13. This will facilitate free turning of the liner when subject to sudden thrust from the wheel or box, thus reducing wear on all the contacting surfaces. In other words, the construction reduces wear of the liner hub and box, which occurs when the driving box face comes over against the face of the wheel at high speed when taking a curve. If a hub liner can revolve with the wheel, as is the case with the use of a loose liner, and same is properly lubricated as outlined above, wear is very slight. By making the liner of brass or other metal softer than the box and hub, wear on the latter members is avoided.

In constructing the liner and applying it to the wheeled axle, the liner halves are first machined along their abutting edges and then attached together by tinning or otherwise, then the groove 8 is cut, dowel pin holes 18 are drilled. The two halves are then separated and are ready for application to the axle. In either an original installation or a renewal, the liner is placed about the axle, dowel pins 19 inserted, and then the band, which is initially provided with radial ears 20 near its ends, is placed in groove 8 and the ends drawn together by a clamp 21, or other suitable tool, applied to the projecting ears, thus gripping the liner about its periphery and holding its parts tightly together. The abutting ends of the band are then welded together and the clamp and ears removed, leaving the endless band seated in groove 8 and free of projections beyond the periphery of liner portion 7. Preferably liner portion 11 is cut away at 22 to facilitate welding of the ends of the band.

Figure 3:
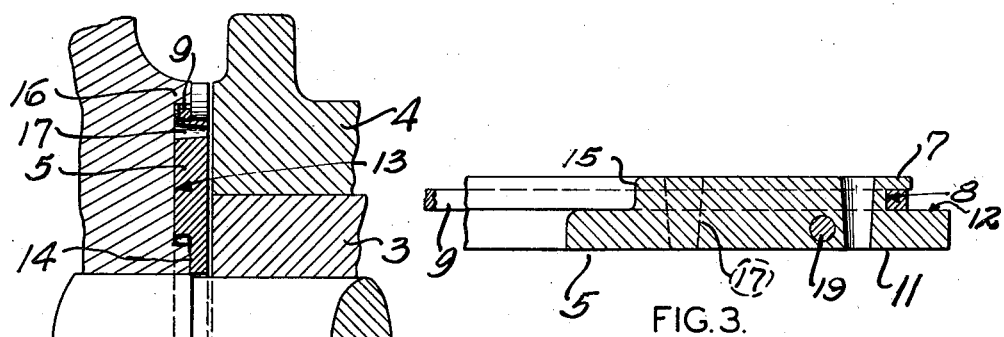
Figure 3 is a detail section through the liner taken on the line 3—3 of Figure 2 and drawn to an enlarged scale.
Figure 1:
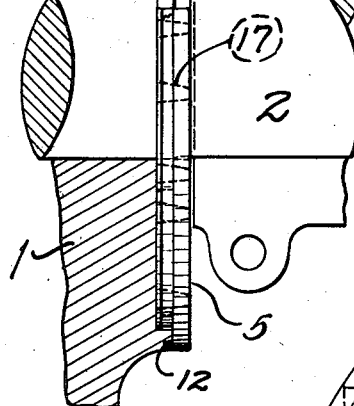
Figure 1 is a vertical section through a wheel hub and the adjacent portion of a driving box and showing in section and elevation a liner between the wheel hub and box.

If the liner is being applied or removed to a journal box and wheeled axle assembly, it is necessary to drop the wheeled axle down far enough to have the driving box clear the locomotive frame and permit of the driving box being moved longitudinally of the axle far enough to afford sufficient room between the driving box and the wheel hub to remove the band and liner and to apply the new liner and do the necessary welding on the band, after which the driving box is returned to its operative relation to the hub and raised with the wheeled axle into the running position, as indicated in Figure 1.

Figure 4:
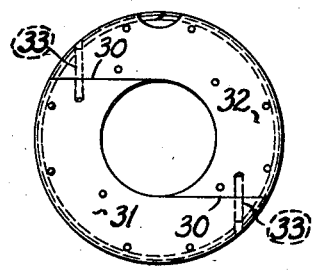
Figure 4 illustrates a modified structure.

Figure 4 illustrates another form of the invention in which the liner, instead of being divided transversely along a diameteric line, is divided transversely along lines 30 extending tangentially of the inner periphery of the liner. In this arrangement, the abutting surfaces between the two liner parts 31 and 32 are longer than in the form previously described and the dowel pins 33 may be made shorter than those in the form previously described and may extend along a chordal line spaced farther from the outer periphery of the liner.

In this structure, the outer periphery of the liner is of the same diameter at both sides of the liner, although grooved between its sides, instead of being shouldered as in the form previously described. With this arrangement, either side of the liner may be inserted in the hub recess and the portion of the periphery projecting from the recess may be surrounded by a band as previously described, the parts 21 and 32 being drawn together by the band and welded as previously described. In some installations, the features present in the construction illustrated in Figure 4 may be preferred to that previously described.

As will be well understood to those skilled in the art, each form of the liner described above eliminates the necessity of building up the opposing faces of the wheel hub and box to restore them to initial dimensions and thereby limit the play of the box and wheel transversely of the locomotive. Such building up requires a more difficult and expensive operation, whereas the replacement of a worn liner, as described, is comparatively easy. The details of the construction may be varied without departing from the spirit of the invention, and the exclusive use of those modifications coming within the scope of the claims is contemplated.

What is claimed is:

1. A railway driving wheel, axle, axle box and interposed liner assembly in which the liner comprises an annular disc divided transversely to provide for its application to the wheeled axle and having a circumferential groove, there being a retaining band in said groove gripping the periphery of the disc and holding its parts together, and the wheel hub having an annular recess, the inner and outer peripheries of the recess corresponding to the inner and outer peripheries of the liner, said recess receiving the hub-opposing portion of the liner and its retaining band.

2. A railway driving wheel, axle, axle box and interposed liner assembly in which the liner comprises an annular disc divided transversely to provide for its application to the wheeled axle and having its outer periphery shouldered transversely of the liner, the liner portion of smaller diameter having a circumferential groove, there being a retaining band seated in said groove gripping the periphery of the disc and holding its parts together, and the wheel hub having an annular recess receiving said portion and band, the rim of the recess abutting the side of the larger diameter liner portion.

3. A railway driving wheel, axle, axle box and interposed liner assembly in which the liner comprises an annular disc divided transversely to provide for its application to the wheeled axle and having a circumferential groove in its outer periphery, there being a retaining band in said groove gripping the periphery of the disc and holding its parts together, the liner having transverse lubricant passages positioned between its inner and outer peripheries and the face of the wheel hub being recessed to receive and closely fit around the peripheries of the liner and the band thereon to resist the radial discharge of lubricant from the opposing faces of the hub and liner.

4. A railway driving wheel, axle, axle box and interposed liner assembly in which the liner comprises an annular disc divided transversely to provide for its application to the wheeled axle, an endless retaining band seated in a circumferential groove in the liner and gripping the periphery of the disc and holding its parts together, and the wheel hub having an annular recess receiving the hub-opposing portion of the liner and including a circular outer periphery fitting closely around the outer periphery of the band.

5. In a railway driving wheel, axle, axle box and interposed liner assembly in which the liner comprises an annular disc divided transversely to provide for its application to the wheeled axle and having a circular periphery, a circular retaining band seated in a circumferential groove in the liner and gripping the periphery of the disc and holding its parts together and having its ends abutting each other and welded together to form an endless retaining device free of securing elements projecting radially of the liner.

6. A liner of the class described comprising a disc divided transversely and having a circular periphery provided with a circumferential groove, and a retaining band seated in said groove and gripping the periphery of the disc and holding its parts together with its ends in abutting relation and secured to each other.

7. A liner of the class described comprising a disc divided transversely and having a circular periphery shouldered transversely of the thickness of the liner, the portion of smaller diameter having a circumferential groove, and a retaining band seated in said groove and gripping the periphery of the disc and holding its parts together with its ends abutting each other and secured together, and the liner portion of larger diameter forming a wheel opposing annular surface extending radially beyond the outer periphery of the band.

8. A liner as described in claim 6 which is divided transversely into two parts, there being means for securing the ends of the band together after application of the liner to an axle.

9. A liner as described in claim 6 which is divided diametrically transversely into two parts, there being means for securing the ends of the band together after application of the liner to an axle.

10. A liner as described in claim 6 which is divided, along lines extending tangentially of its inner periphery, into two parts, there being means for securing the ends of the band together after application of the liner to an axle.

11. A liner as described in claim 6 which is divided, along lines extending tangentially at opposite sides of its inner periphery, into two parts, there being means for securing the ends of the band together after application of the liner to an axle.

JAS. J. HENNESSY.